US012276135B2

(12) United States Patent
Lyu et al.

(10) Patent No.: US 12,276,135 B2
(45) Date of Patent: Apr. 15, 2025

(54) REFRIGERATOR

(71) Applicants: QINGDAO HAIER REFRIGERATOR CO., LTD., Shandong (CN); HAIER SMART HOME CO., LTD., Shandong (CN)

(72) Inventors: Peng Lyu, Qingdao (CN); Hao Zhang, Qingdao (CN); Jiaming Li, Qingdao (CN); Zhanpeng Cui, Qingdao (CN); Sen Mou, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 20 days.

(21) Appl. No.: 18/245,121

(22) PCT Filed: Sep. 7, 2021

(86) PCT No.: PCT/CN2021/116939

§ 371 (c)(1),
(2) Date: Mar. 13, 2023

(87) PCT Pub. No.: WO2022/057687

PCT Pub. Date: Mar. 24, 2022

(65) Prior Publication Data

US 2023/0358077 A1 Nov. 9, 2023

(30) Foreign Application Priority Data

Sep. 15, 2020 (CN) ......................... 202010969257.3

(51) Int. Cl.
*E05B 47/00* (2006.01)
*F25D 23/02* (2006.01)

(52) U.S. Cl.
CPC ........ *E05B 47/0046* (2013.01); *F25D 23/028* (2013.01)

(58) Field of Classification Search
CPC ... E05C 19/166; E05B 47/0046; F25D 23/028
See application file for complete search history.

(56) References Cited

FOREIGN PATENT DOCUMENTS

CN 204006926 U * 12/2014
CN 106403477 A 2/2017
(Continued)

OTHER PUBLICATIONS

International Search Report and Written Opinion for PCT/CN2021/116939 (ISA/CN) mailed Dec. 8, 2021 w/English translation (9 pages).

(Continued)

*Primary Examiner* — Matthew W Ing
(74) *Attorney, Agent, or Firm* — Alston & Bird LLP

(57) ABSTRACT

A refrigerator, comprising a refrigerator body, a main door arranged on an outer side of the refrigerator body, and a secondary door arranged on an outer side of the main door. A first magnet is arranged in an area of the refrigerator body opposite the main door, a second magnet is arranged in an area of the secondary door opposite the main door, and an electromagnetic assembly is arranged on the main door and configured to controllably or operably generate a magnetic attraction force for attracting the first magnet or a magnetic attraction force for attracting the second magnet. The magnetic attraction effect ensures that the door body, which does not need to be opened, will be in a closed state when a user opens the refrigerator.

10 Claims, 7 Drawing Sheets

(56) References Cited

FOREIGN PATENT DOCUMENTS

| | | | | | |
|---|---|---|---|---|---|
| CN | 106595204 | A | * | 4/2017 | |
| CN | 108072224 | A | * | 5/2018 | ............. F25D 23/02 |
| CN | 208154899 | U | | 11/2018 | |
| CN | 108955023 | A | | 12/2018 | |
| CN | 111256420 | A | | 6/2020 | |
| KR | 20090106934 | A | * | 10/2009 | |

OTHER PUBLICATIONS

1st Examination Report for Australian Patent Application No. 2021344360 dated Mar. 5, 2024 (4 pages).
1st European Office Action for European Patent Application No. 21868512.1 dated Jan. 8, 2024 (6 pages).
European Search Report for European Patent Application No. 21868512.1 dated Dec. 20, 2023 (4 pages).
2nd Office Action for European Patent Application No. 21868512.1 dated Jul. 12, 2024 (6 pages).
2nd Examination Report for Australia Patent Application No. 2021344360 dated Aug. 6, 2024 (3 pages).
1ST Office Action for China Patent Application No. 202010969257.3 dated Nov. 5, 2024, w/English translation (18 pages).

* cited by examiner

REFRIGERATOR

CROSS-REFERENCE TO RELATED APPLICATIONS

The present application is a national phase entry of International Application No. PCT/CN2021/116939, filed Sep. 7, 2021, which claims priority to Chinese Application No. 202010969257.3, filed Sep. 15, 2020, which are each incorporated herein by reference in its entirety.

FIELD OF THE INVENTION

The present invention relates to the technical field of refrigeration and freezing, and in particular to a refrigerator.

BACKGROUND OF THE INVENTION

With the continuous development of home appliance technology, door-in-door refrigerators have appeared on the market. Two door bodies, i.e., a main door and a secondary door, are disposed at an outer side of the refrigerator, and a storage space is defined in the main door to facilitate a user to store commonly used articles, so that the frequency of the user opening the storage space of a refrigerator body is reduced, and the heat loss of the refrigerator is accordingly reduced.

In the prior art, in order to seal a gap between the inner and outer door bodies, a magnetic sealing strip is generally used, so that the main door is adsorbed on the refrigerator body by means of the sealing strip in a closed state, and the secondary door is adsorbed on the main door. However, when in use, the secondary door is often brought out when the user opens the main door, or the main door is brought out when the secondary door is opened, which affects the user's sense of use experience.

BRIEF DESCRIPTION OF THE INVENTION

An object of the present invention is to overcome at least one of the defects in the prior art, and to provide a refrigerator.

A further object of the present invention is to prevent articles from falling when a user opens a main door or a secondary door of a door-in-door refrigerator.

Another further object of the present invention is to improve the user's sense of use experience.

In particular, the present invention provides a refrigerator, including:

- a refrigerator body;
- a main door disposed at an outer side of the refrigerator body, and a secondary door disposed at an outer side of the main door;
- a first magnet, disposed in an area of the refrigerator body opposite the main door;
- a second magnet, disposed in an area of the secondary door opposite the main door; and
- an electromagnetic assembly, disposed on the main door and configured to controllably or operably generate a magnetic attraction force for attracting the first magnet or a magnetic attraction force for attracting the second magnet.

Further, the electromagnetic assembly includes:

- a first electromagnet, disposed at a side of the main door facing the refrigerator body; and
- a second electromagnet, disposed at a side of the main door facing the secondary door; and

- the first electromagnet and the second electromagnet are configured to: controllably switch on a power supply of the second electromagnet to generate the magnetic attraction force for attracting the second magnet, so that the secondary door remains a closed state; or controllably switch on a power supply of the first electromagnet to generate the magnetic attraction force for attracting the first magnet, so that the main door remains in a closed state.

Further, the electromagnetic assembly also includes:

- a first control switch, electrically connected to the first electromagnet; and
- a second control switch, electrically connected to the second electromagnet; and
- the first control switch and the second control switch are configured to receive an on-off command from a user to correspondingly perform on-off control on a circuit in which the first electromagnet is located and a circuit in which the second electromagnet is located.

Further, the first control switch is disposed on the secondary door; and

- the second control switch is disposed on the main door.

Further, the electromagnetic assembly includes:

- a third electromagnet, disposed along a front-rear direction of the main door, and configured to change the magnetism of both ends of the third electromagnet by changing the direction of its current; and
- the sides, facing the third electromagnet, of the first magnet and the second magnet have the same magnetism, so that the magnetic attraction force is always generated between the third electromagnet and the first magnet or between the third electromagnet and the second magnet in a current direction changing process of the third electromagnet.

Further, the electromagnetic assembly includes:

- a first touch control unit, disposed on the main door, and configured to receive a command that a user opens the main door;
- a second touch control unit, disposed on the secondary door, and configured to receive a command that a user opens the secondary door; and
- a control unit, electrically connected to the first touch control unit and the second touch control unit, respectively, and configured to:
- receive a command signal sent by the first touch control unit, and control the current of the third electromagnet to flow in a first direction, to make the third electromagnet generate the magnetic attraction force for attracting the second magnet, so as to enable the secondary door to be in a closed state under the action of the magnetic attraction force when the user opens the main door; or
- receive a command signal sent by the second touch control unit, and control the current of the third electromagnet to flow in a direction opposite to the first direction, to make the third electromagnet generate the magnetic attraction force for attracting the first magnet, so as to enable the main door to be in a closed state under the action of the magnetic attraction force when the user opens the secondary door.

Further, the main door is provided with a first handle, and the secondary door is provided with a second handle; and

- the first touch control unit is disposed on the first handle, and the second touch control unit is disposed on the second handle.

Further, a distance between the first handle and the second handle is not less than 3 cm.

Further, an area of the main door opposite the refrigerator body and an area of the main door opposite the secondary door are separately provided with a magnetic door seal, and the magnetic door seals are configured such that the magnetic door seals are used to attract the refrigerator body and the secondary door in a state where the third electromagnet is not energized, to seal gaps between the main door and the secondary door, and between the main door and the refrigerator body.

Further, a first storage space is defined inside the refrigerator body, the first storage space has a first opening forward, and the main door is pivotally connected to one side of the refrigerator body to open and close the first opening; and a second storage space is defined inside the main door, the second storage space has a second opening forward, and the secondary door is pivotally connected to one side of the main door to open and close the second opening.

According to the refrigerator provided by the present invention, the first magnet is disposed in the area of the refrigerator body opposite the main door, the second magnet is disposed in the area of the secondary door opposite the main door, and the electromagnetic assembly is disposed on the main door; therefore, before the user wants to open the main door or the secondary door, the electromagnetic assembly can be activated to generate a magnetic attraction force, so that a door body that does not need to be opened is enabled to be in a closed state, and the articles placed in the first storage space or the second storage space are prevented from being brought out by inertia accordingly; and therefore, the user's sense of use experience is improved, and the heat loss of the refrigerator is also avoided.

Further, according to the refrigerator provided by the present invention, the third electromagnet is disposed on the main door along the front-rear direction; since the sides, facing the third electromagnet, of the first magnet and the second magnet have the same magnetism, after the third electromagnet is energized, one of magnetic poles generated on a magnet core of the third electromagnet must generate a magnetic attraction force that is attracted to the first magnet or the second magnet, and the other one is subject to a magnetic repulsion force; and the magnetic attraction force can make the door body that does not need to be opened be in a closed state, and the magnetic repulsion force can make the user easily open the door to be opened, so that the user's sense of use experience is improved.

The above and other objectives, advantages, and features of the present invention will be better understood by those skilled in the art according to the following detailed description of specific embodiments of the present invention in conjunction with the accompanying drawings.

BRIEF DESCRIPTION OF THE DRAWINGS

In the following part, some specific embodiments of the present invention will be described in detail in an exemplary rather than limited manner with reference to the accompanying drawings. The same reference numerals in the accompanying drawings indicate the same or similar components or parts. Those skilled in the art should understand that these accompanying drawings are not necessarily drawn to scale. In figures.

DETAILED DESCRIPTION

In the description of the present invention, it should be understood that the orientation or positional relationship indicated by the terms 'longitudinal', 'transverse', 'length', 'width', 'thickness', 'upper', 'lower', 'front', 'rear', 'left', 'right', 'vertical', 'horizontal', 'top', 'bottom', 'depth', etc. are based on the orientation of a storage device under normal use as a reference, and can be determined by referring to the orientation or positional relationship shown in the accompanying drawings; and for example, the 'front' indicating the orientation refers to the side of the refrigerator facing a user. This is only for the convenience of describing the present invention and simplifying the description, rather than indicating or implying that a device or an element referred to must has a particular orientation, and be constructed and operated in a particular orientation, and therefore cannot be construed as a limitation of the present invention.

Figure 1:
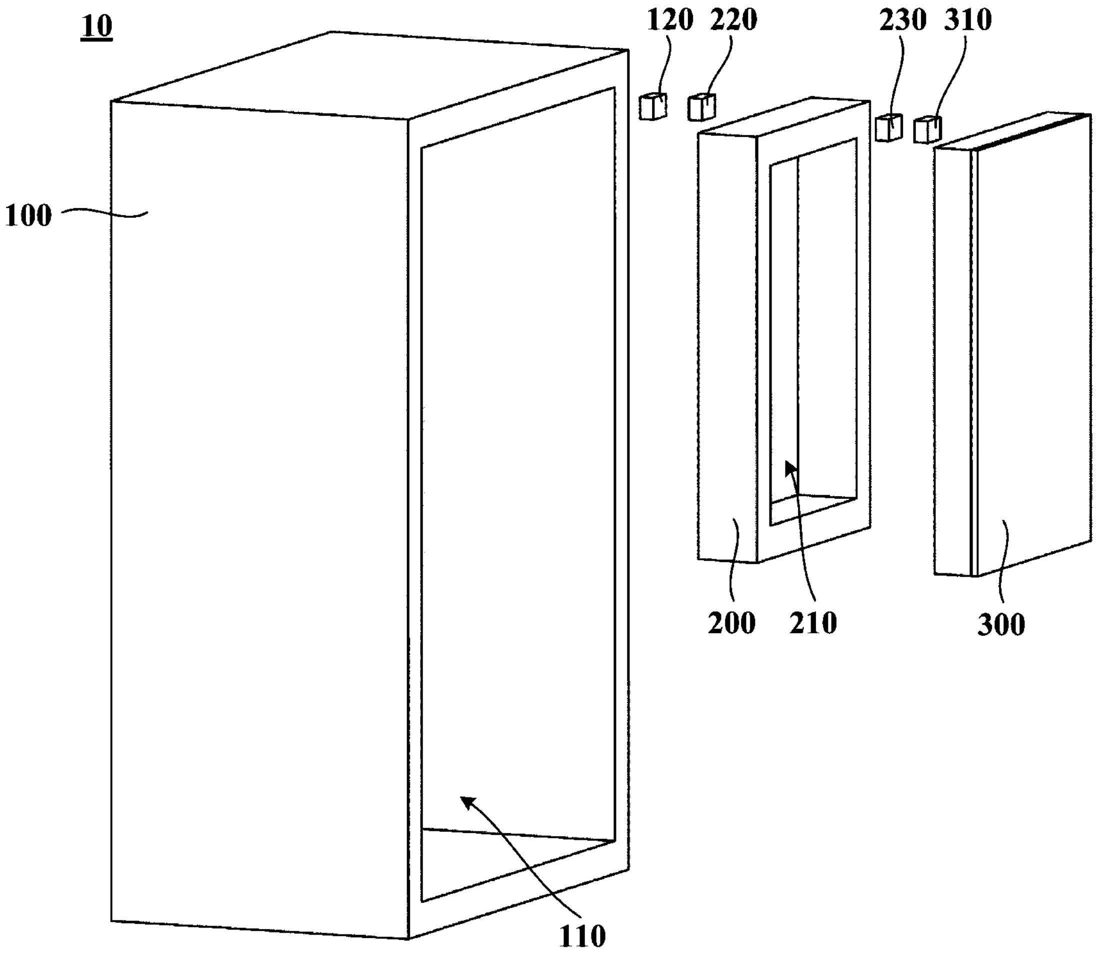
FIG. 1 is an exploded view of a refrigerator according to an embodiment of the present invention.

Referring to FIG. 1, the present invention provides a refrigerator 10, which may include a refrigerator body 100, a main door 200 and a secondary door 300.

A first storage space 110 is defined inside the refrigerator body 100, the first storage space 110 has a first opening forward, and the main door 200 is pivotally connected to an outer side of the refrigerator body 100 to open and close the first opening. A second storage space 210 is defined inside the main door 200, the second storage space 210 has a second opening forward, and the secondary door 300 is pivotally connected to an outer side of the main door 200 to open and close the second opening.

In the embodiment, both the first storage space 110 inside the refrigerator body 100 and the second storage space 210 inside the main door 200 can be used by a user to store food, and the user can choose to store articles in the first storage space 110 or the second storage space 210 according to the use frequency or volume size of the articles. For example, the user can store some articles, which are more frequently used and occupy small spaces, in the second storage space 210, and store some articles, that are less frequently used and occupy large spaces, in the first storage space 110, thus avoiding the user from frequently opening door bodies and further reducing heat loss. Moreover, a storage area of the refrigerator 10 can be divided by the first storage space 110 or the second storage space 210, which is helpful for the user to sort the articles. In some preferred embodiments, the first storage space 110 may also be a refrigerating room of the refrigerator 10.

In the embodiment, the refrigerator 10 may further include a first magnet 120, a second magnet 310 and an electromagnetic assembly.

The first magnet 120 is disposed in an area of the refrigerator body 100 opposite the main door 200; the second magnet 310 is disposed in an area of the secondary door 300 opposite the main door 200; and the electromagnetic assembly is disposed on the main door 200 and configured to controllably or operably generate a magnetic attraction force for attracting the first magnet 120 or a magnetic attraction force for attracting the second magnet 310.

As mentioned in the background art section, in the prior art, in order to seal a gap between the inner and outer door bodies, a magnetic sealing strip is generally used, so that the main door is adsorbed on the refrigerator body by means of the sealing strip in a closed state, and the secondary door is adsorbed on the main door. However, when in use, the secondary door is often brought out when the user opens the main door, or the main door is brought out when the secondary door is opened, which affects the user's sense of use experience.

In order to overcome the above-mentioned defect in the prior art, in the refrigerator 10 of the embodiment, the first magnet 120 is disposed in the area of the refrigerator body 100 opposite the main door 200, the second magnet 310 is disposed in the area of the secondary door 300 opposite the main door 200, and the electromagnetic assembly is disposed on the main door 200. Before the user wants to open the main door 200 or the secondary door 300, the electromagnetic assembly can be activated to generate a magnetic attraction force, so that the door body that does not need to be opened is enabled to be in a closed state. For example, before the user wants to open the main door 200, the electromagnetic assembly can generate a magnetic attraction force for attracting the secondary door 300, so that the main door 200 and the secondary door 300 are enabled to form a whole. When the user opens the main door 200, the secondary door 300 will not be opened, which prevents the articles placed in the second storage space 210 from being brought out by inertia, thereby improving the user's sense of use experience. For another example, before the user wants to open the secondary door 300, the electromagnetic assembly can generate a magnetic attraction force for attracting the main door 200, so that the main door 200 and the refrigerator body 100 are enabled to form a whole. When the user opens the secondary door 300, the main door 200 will not be opened, which can not only prevent the articles in the first storage space 110 from being brought out by inertia, but also avoids the heat loss of the refrigerator 10.

Figure 2:
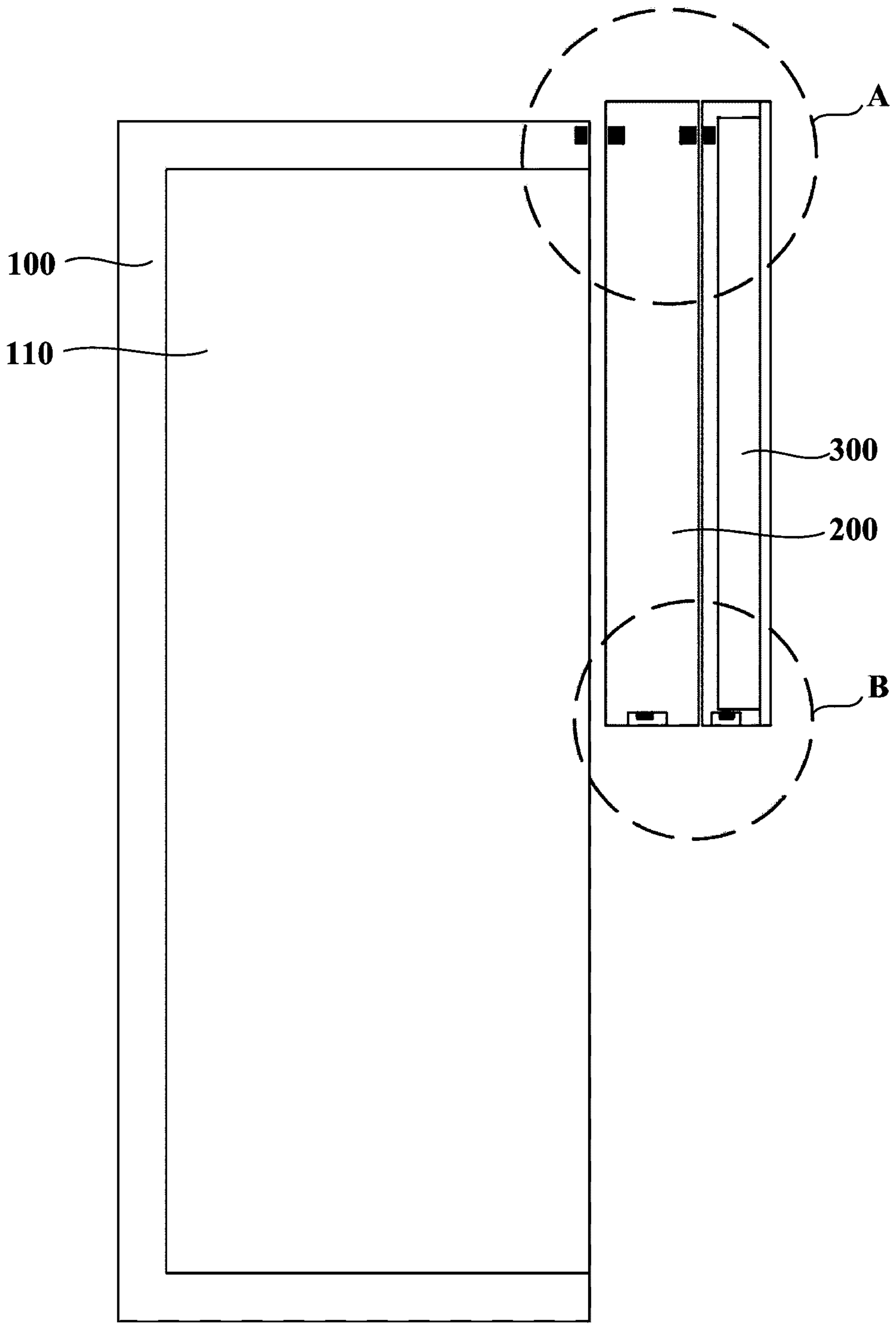
FIG. 2 is a cross-sectional view of a refrigerator according to an embodiment of the present invention.
Figure 3:
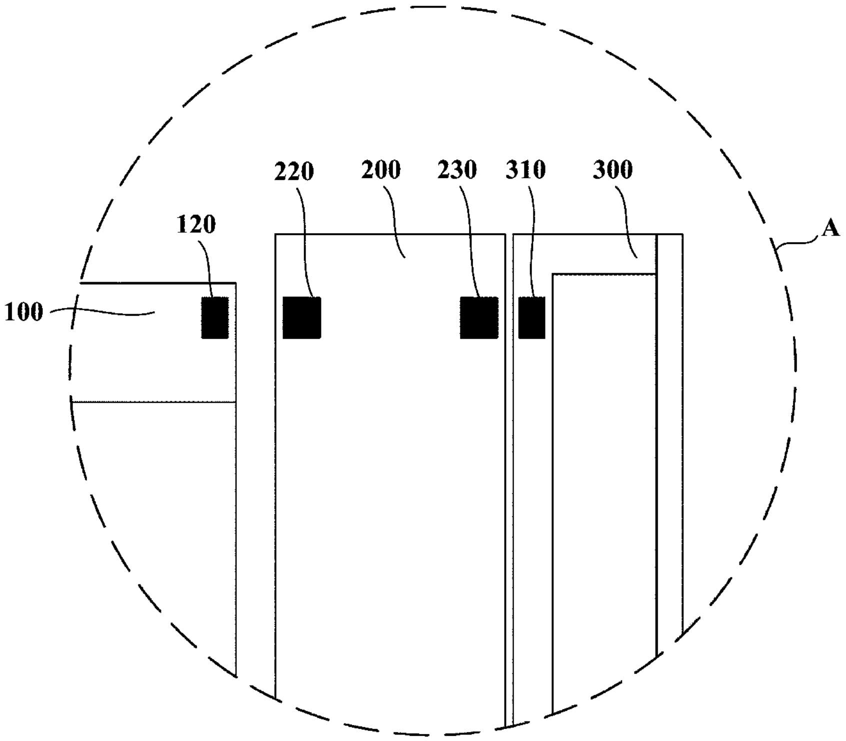
FIG. 3 is an enlarged view at A in FIG. 2.

Referring to FIGS. 1 to 3, in some embodiments of the present application, the electromagnetic assembly may further include a first electromagnet 220 and a second electromagnet 230. The first electromagnet 220 is disposed at a side of the main door 200 facing the refrigerator body 100, and the second electromagnet 230 is disposed at a side of the main door 200 facing the secondary door 300.

Specifically, a mounting groove (not shown in the figures) opposite to the first magnet 120 is formed at the side of the main door 200 facing the refrigerator body 100, and another mounting groove (not shown in the figures) opposite to the second magnet 310 is also formed at the side of the main door 200 facing the secondary door 300. The first electromagnet 220 and the second electromagnet 230 are respectively disposed in the mounting grooves.

Before the user wants to open the main door 200, a wire of the second electromagnet 230 is energized, and the second electromagnet 230 attracts the second magnet 310, so that the secondary door 300 remains closed; and before the user wants to open the secondary door 300, to a wire of the first electromagnet 220 is energized, and the first electromagnet 220 attracts the first magnet 120, so that the main door 200 remains closed.

In the embodiment, the current directions of the first electromagnet 220 and the second electromagnet 230 can also be configured to be fixed when they are energized, so that the directions of magnetic poles generated by the first electromagnet 220 and the second electromagnet 230 after being energized are not changed. For example, after the first electromagnet 220 is energized, an N pole of the magnetic poles generated by the first electromagnet 220 is oriented toward the first magnet 120. At this time, a magnetic pole of the first magnet 120 opposite the first electromagnet 220 can be configured as an S pole, thus achieving mutual attraction after energization.

Of course, the first electromagnet 220 may also be configured such that after the first electromagnet 220 is energized, an S pole of the magnetic poles generated by the first electromagnet 220 is oriented toward the first magnet 120, and the first magnet 120 can be adjusted accordingly, which is not specifically limited in the present application. The same is true for the second electromagnet 230 and the second magnet 310.

In some alternative embodiments, the positions of the first magnet 120 and the first electromagnet 220 can be interchanged, and the positions of the second electromagnet 230 and the second magnet 310 can also be interchanged. That is, if the first magnet 120 and the second magnet 310 are disposed on the main door 200, and the first electromagnet 220 and the second electromagnet 230 are respectively disposed on the refrigerator body 100 and the secondary door 300, the technical effects in the above embodiments can also be achieved, so we will not repeat them here.

Figure 4:
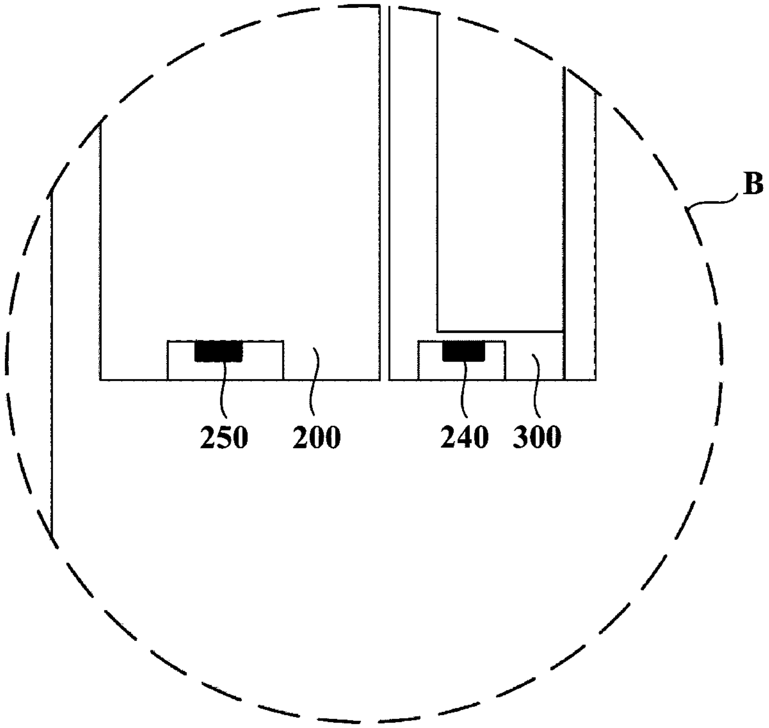
FIG. 4 is an enlarged view at B in FIG. 2.

Referring to FIG. 4, the electromagnetic assembly may further include a first control switch 240 and a second control switch 250, where the first control switch 240 is electrically connected to the first electromagnet 220, the second control switch 250 is electrically connected to the second electromagnet 230, and the first control switch 240 and the second control switch 250 are configured to receive an on-off command from the user to perform on-off control on a circuit in which the first electromagnet 220 is located and a circuit in which the second electromagnet 230 is located.

Press-type switches may be adopted as the first control switch 240 and the second control switch 250. Before the user wants to open the main door 200, the circuit where the second electromagnet 230 is located can be formed into a closed circuit by operating the second control switch 250, so that the wire of the second electromagnet 230 is energized; and before the user wants to open the secondary door 300, the circuit where the first electromagnet 220 is located can be formed into a closed circuit by operating the first control switch 240, so that the wire of the first electromagnet 220 is energized.

In the embodiment, the first control switch 240 and the second control switch 250 may also be configured to automatically enable the circuit where the first electromagnet 220 is located and the circuit where the second electromagnet 230 is located to be formed into an open circuit after the user operates the first control switch and the second control switch for a preset time.

For example, before opening the main door 200, the user presses to operate the second control switch 250, the wire of the second electromagnet 230 is energized, and the main door 200 and the secondary door 300 form a whole. After the preset time has passed, it is assumed that the user has completed a pick-and-place action. At this time, there is no need to attach the main door 200 and the secondary door 300 together, and then the second control switch 250 can be restored to the state before the operation so as to enable the circuit where the second electromagnet 230 is located to be formed into the open circuit for preparing for the next operation; and furthermore, electricity is saved. Preferably, the above-mentioned preset time can also be configured to be any value within a range of 5-20 s, such as 5 s, 15 s, or 20 s.

Referring to FIG. 4, in the embodiment, the first control switch 240 may also be disposed on the secondary door 300, and the second control switch 250 may also be disposed on the main door 200.

Since the first control switch 240 controls the first electromagnet 220, when the user opens the secondary door 300, the first electromagnet 220 needs to be attracted to the first magnet 120 disposed on the refrigerator body 100 after being energized. Therefore, disposing the first control switch 240 on the secondary door 300 can facilitate the user to operate the first control switch 240 while opening the secondary door 300, and the first control switch does not need to be operated separately, which improves the user's sense of use experience. Similarly, disposing the second control switch 250 on the main door 200 is also based on the above inventive concept.

Figure 5:
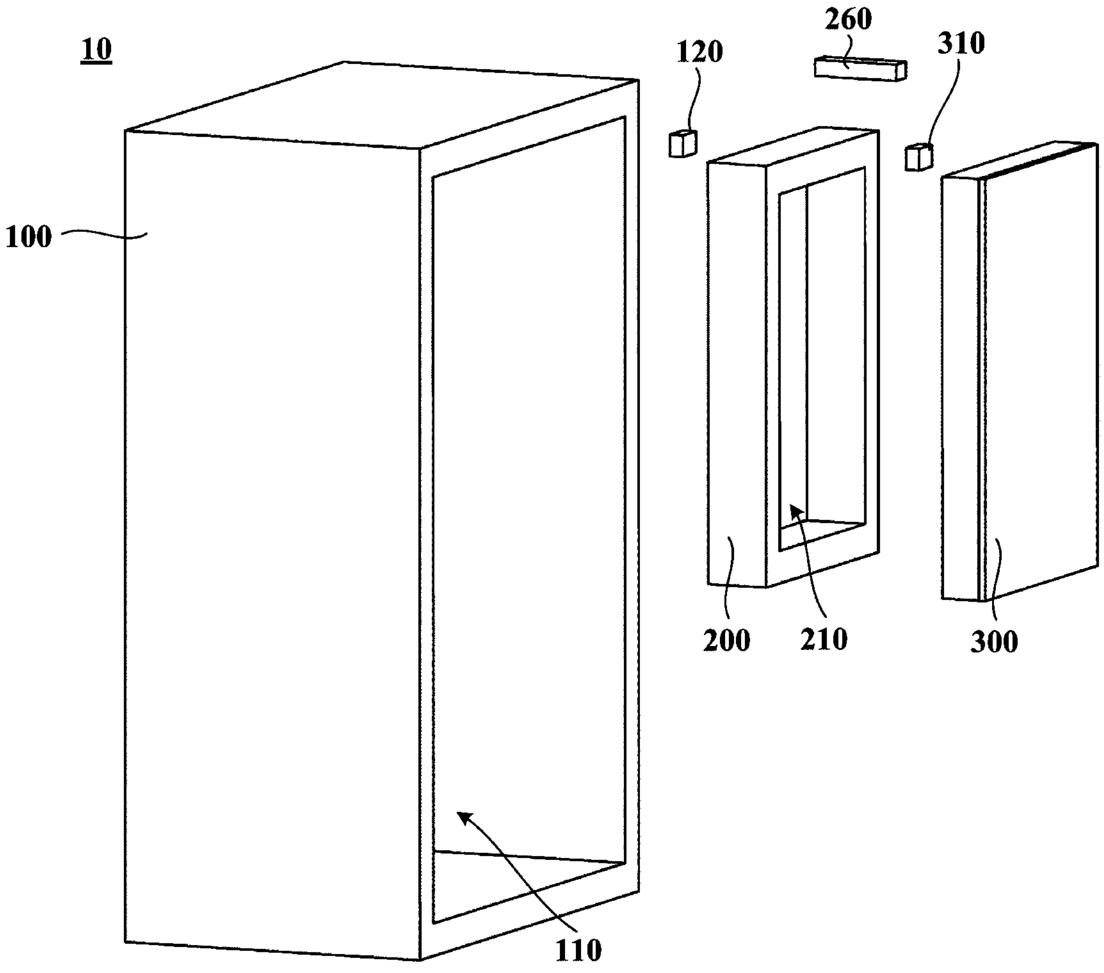
FIG. 5 is an exploded view of a refrigerator according to another embodiment of the present invention.
Figure 6:
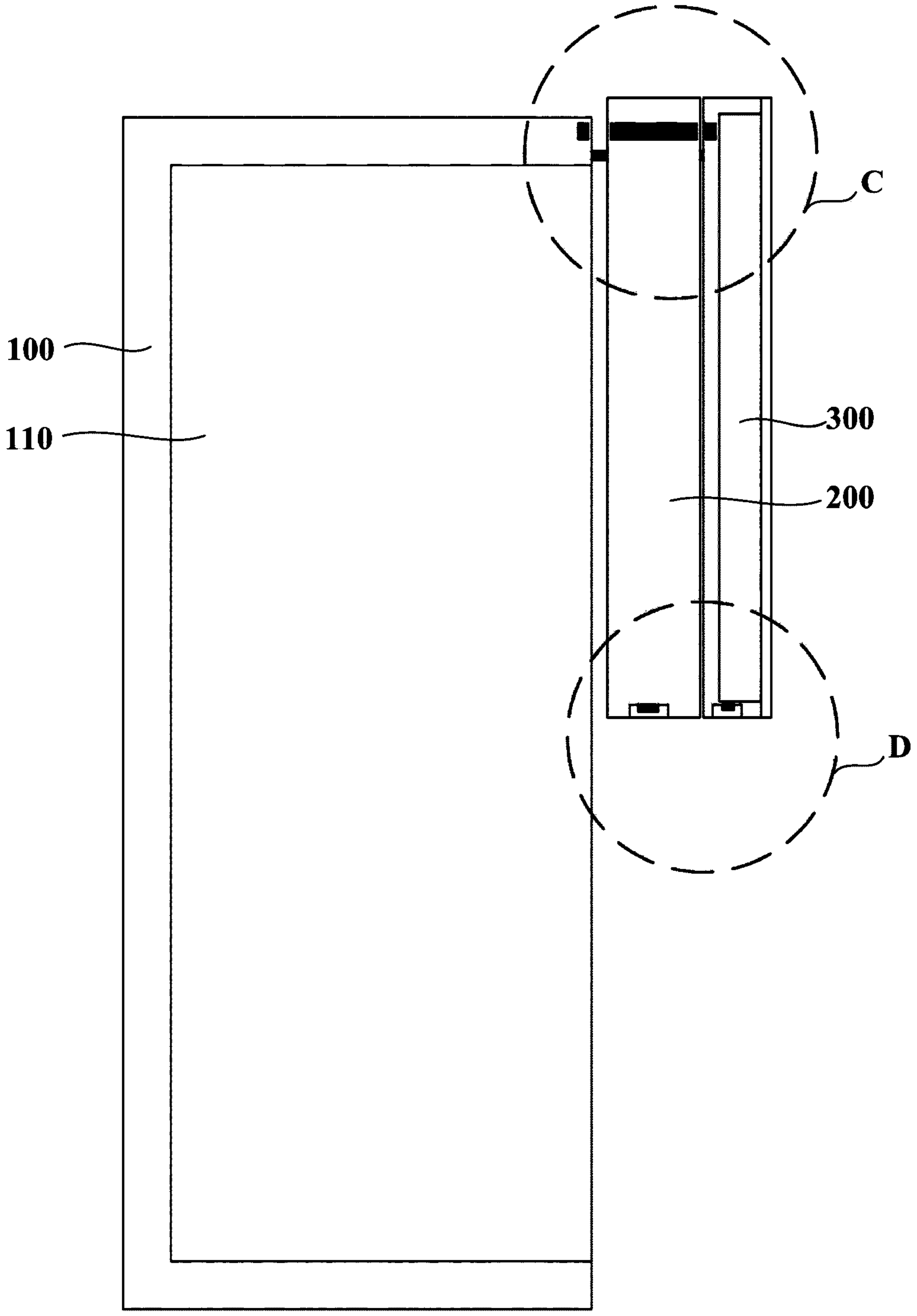
FIG. 6 is a cross-sectional view of a refrigerator according to another embodiment of the present invention.
Figure 7:
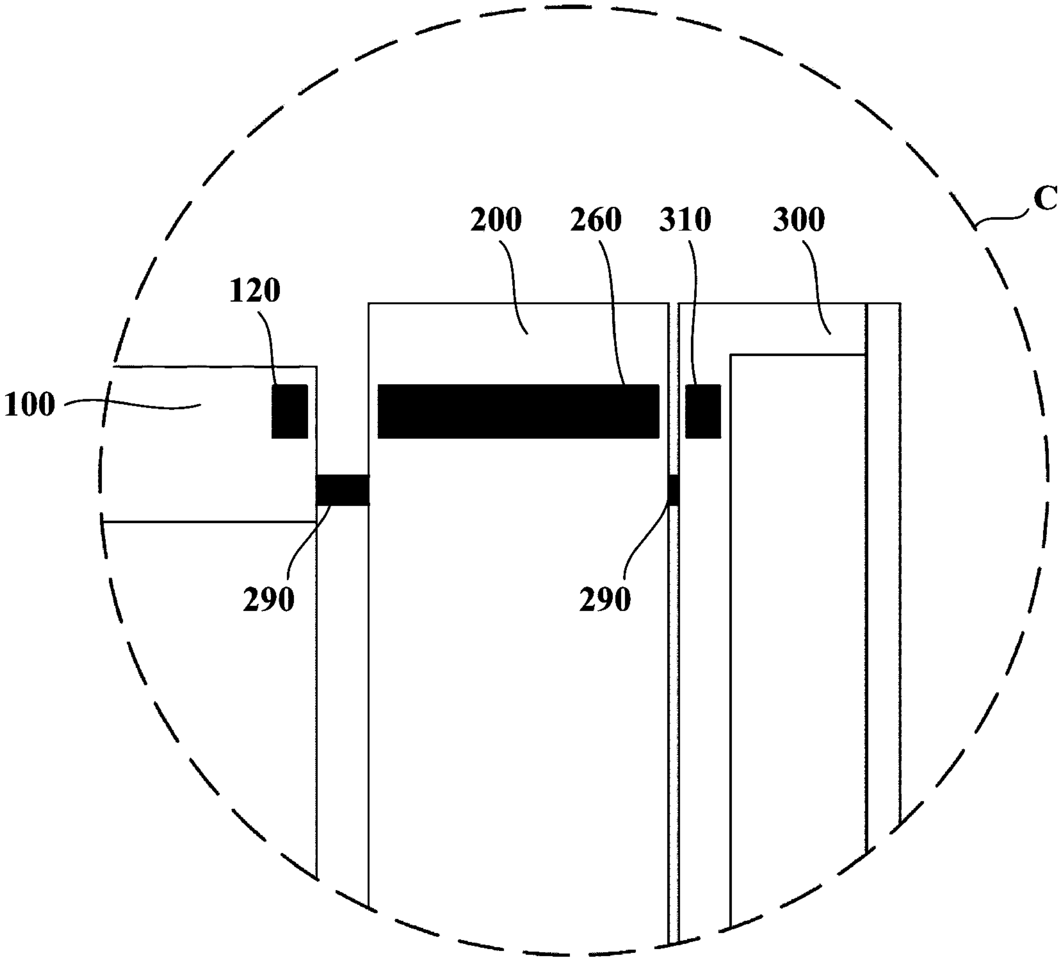
FIG. 7 is an enlarged view at C in FIG. 6.

Referring to FIGS. 5 to 7, in other embodiments, the electromagnetic assembly may include a third electromagnet 260, and the third electromagnet 260 is disposed along a front-rear direction of the main door 200, and configured to change the magnetism of both ends of the third electromagnet 260 by changing the direction of its current; and the sides, facing the third electromagnet 260, of the first magnet 120 and the second magnet 310 have the same magnetism, so that the magnetic attraction force is always generated between the third electromagnet 260 and the first magnet 120 or between the third electromagnet 260 and the second magnet 310 in a current direction changing process of the third electromagnet 260.

Specifically, the main door 200 is provided with a groove (not shown in the figures) along the front-rear direction, and front and rear ends of the groove are respectively opposite to the first magnet 120 and the second magnet 310, and the third electromagnet 260 is disposed in the groove. Since the sides, facing the third electromagnet 260, of the first magnet 120 and the second magnet 310 have the same magnetism, after the third electromagnet 260 is energized, one of magnetic poles generated on a magnet core of the third electromagnet must generate a magnetic attraction force that is attracted to the first magnet 120 or the second magnet 310, and the other one is subject to a magnetic repulsion force.

For example, the side of the first magnet 120 facing the third electromagnet 260 is an N pole, and the side of the second magnet 310 facing the third electromagnet 260 is also an N pole. When the third electromagnet 260 is energized, if an S pole of the magnetic poles generated on the magnet core of the third electromagnet faces the first magnet 120, the first magnet 120 is attracted to the third electromagnet 260. On the contrary, the second magnet 310 is repelled from the third electromagnet 260. At this time, if the user wants to open the secondary door 300, not only are the main door 200 and the refrigerator body 100 allowed to form a whole, but the user can also easily open the secondary door 300 by using the repulsion force between the second magnet 310 and the third electromagnet 260.

Therefore, after the third electromagnet 260 is energized, no matter how the direction of the current loaded on the third electromagnet 260 changes, there must be a magnetic attraction force between the third electromagnet and one of the first magnet 120 and the second magnet 310 and a magnetic repulsion force between the third electromagnet and the other of the first magnet 120 and the second magnet 310. The user only needs to control the direction of the current loaded on the third electromagnet 260 to realize the conversion of objects on which the magnetic attraction force and the magnetic repulsion force act.

Figure 8:
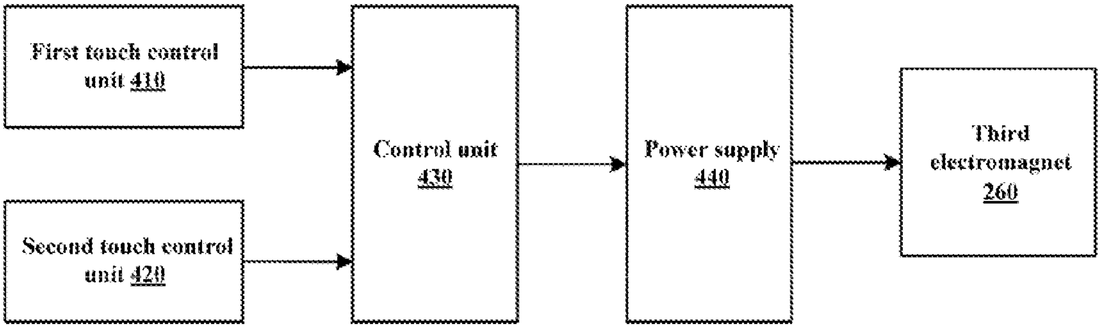
FIG. 8 is a block diagram of a working principle of a refrigerator according to another embodiment of the present invention.

Further, referring to FIG. 8, the electromagnetic assembly may further include a first touch control unit 410, a second touch control unit 420, and a control unit 430.

The first touch control unit 410 is disposed on the main door 200, and configured to receive a command that a user opens the main door 200; the second touch control unit 420 is disposed on the secondary door 300, and configured to receive a command that a user opens the secondary door 300; the control unit 430 is electrically connected to the first touch control unit 410 and the second touch control unit 420, respectively, and configured to: receive a command signal sent by the first touch control unit 410, and control the current of the third electromagnet 260 to flow in a first direction, to make the third electromagnet 260 generate the magnetic attraction force for attracting the second magnet 310, so as to enable the secondary door 300 to be in a closed state under the action of the magnetic attraction force when the user opens the main door 200; or receive a command signal sent by the second touch control unit 420, and control the current of the third electromagnet 260 to flow in a direction opposite to the first direction, to make the third electromagnet 260 generate the magnetic attraction force for attracting the first magnet 120, so as to enable the main door 200 to be in a closed state under the action of the magnetic attraction force when the user opens the secondary door 300.

Specifically, the first touch control unit 410 and the second touch control unit 420 may be configured as sensors such as infrared sensors to sense the position of the user's hand. When the user's hand is close to a sensing area of the first touch control unit 410, the first touch control unit 410 sends a command signal that the user opens the main door 200 to the control unit 430. The control unit 430 can also be electrically connected with a power supply 440 for the third electromagnet 260 to control the power supply 440 to load current in the first direction to the third electromagnet 260. The loading current in the first direction here can be understood as a direction in which a magnetic attraction force can be generated between the third electromagnet 260 and the second magnet 310, and a magnetic repulsion force can be generated between the third electromagnet 260 and the first magnet 120. The magnetic attraction force is used to make the secondary door 300 and the main door 200 attract together, and the magnetic repulsion force is used to help open the main door 200. Similarly, when the control unit 430 controls the current in a second direction from the power supply 440 to the third electromagnet 260, the main door 200 and the refrigerator body 100 are attracted together, and the magnetic repulsion force is used to assist in opening the secondary door 300.

Further, the control unit 430 may also be configured to cut off the third electromagnet 260 after a preset time of applying current to the third electromagnet 260. For example, when the first touch control unit 410 senses the position of the user's hand, the control unit 430 applies current to the third electromagnet 260. After the preset time has passed, it is assumed that the user has completed the pick-and-place action. At this time, the control unit 430 controls the power supply 440 to be turned off to prepare for the next start. Preferably, the above-mentioned preset time may also be configured to be any value within a range of 2-5 s, such as 2 s, 3 s, or 5 s.

Figure 9:
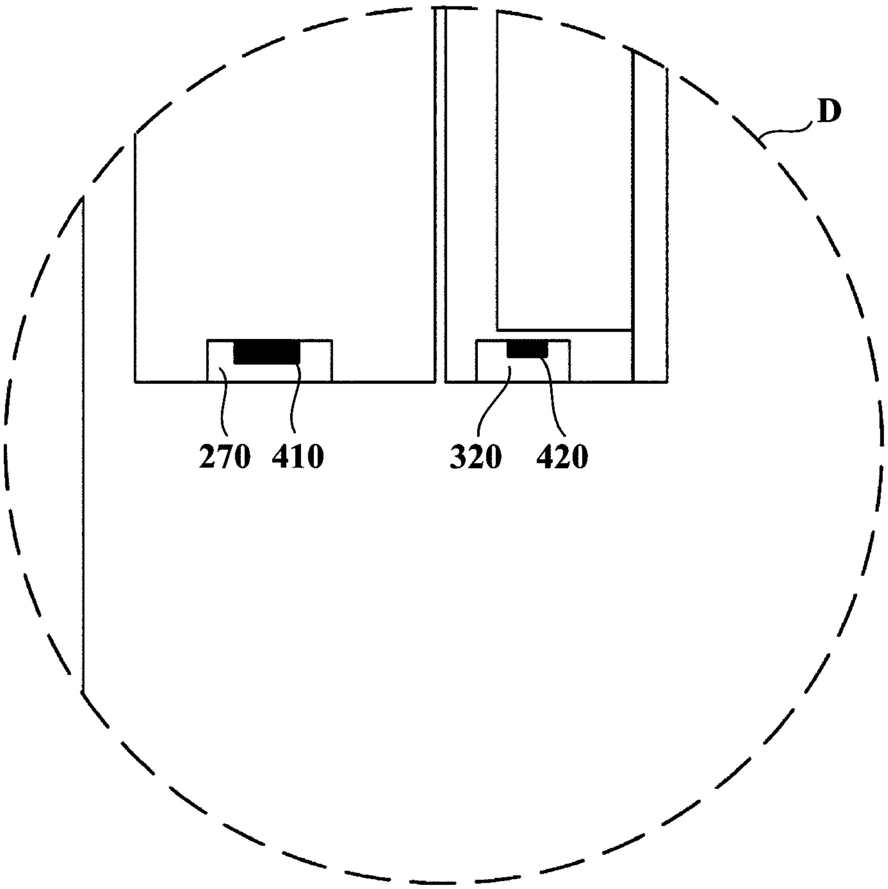
FIG. 9 is an enlarged view at D in FIG. 6.

Referring to FIG. 9, in the embodiment, the main door 200 is provided with a first handle 270, and the secondary door 300 is provided with a second handle 320; and the first touch control unit 410 is disposed on the first handle 270, and the second touch control unit 420 is disposed on the second handle 320.

Because the first touch control unit 410 and the second touch control unit 420 can receive a signal indicating that the user's hand is approaching, and the first touch control unit 410 and the second touch control unit 420 are respectively disposed on the first handle 270 and the second handle 320, the user must operate the first handle 270 and the second handle 320 when opening the door, and at this time, the first touch control unit 410 and the second touch control unit 420 can also receive a door opening signal, which improves the reliability during door opening.

Since the first touch control unit 410 and the second touch control unit 420 are disposed on the first handle 270 and the second handle 320, in order to avoid misoperation, a distance between the first handle 270 and the second handle 320 is configured to be not less than 3 cm (e.g., 3 cm, 5 cm, 10 cm, etc.), thereby further improving the reliability during door opening.

Referring to FIG. 7, an area of the main door 200 opposite the refrigerator body 100 and an area of the main door 200 opposite the secondary door 300 are separately provided with a magnetic door seal 290, and the magnetic door seals 290 are configured such that the magnetic door seals 290 are used to attract the refrigerator body 100 and the secondary door 300 in a state where the third electromagnet 260 is not energized, to seal gaps between the main door 200 and the secondary door 300, and between the main door 200 and the refrigerator body 100.

Hereto, those skilled in the art should realize that although a plurality of exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and recognized as covering all these other variations or modifications.

What is claimed is:

1. A refrigerator, comprising:

a refrigerator body;

a main door disposed at an outer side of the refrigerator body, and a secondary door disposed at an outer side of the main door;

a first magnet, disposed in an area of the refrigerator body opposite the main door;

a second magnet, disposed in an area of the secondary door opposite the main door; and an electromagnetic assembly, disposed on the main door and configured to controllably or operably generate a magnetic attraction force for attracting the first magnet or a magnetic attraction force for attracting the second magnet, the electromagnetic assembly comprising:

a first electromagnet, disposed at a side of the main door facing the refrigerator body;

a second electromagnet, disposed at a side of the main door facing the secondary door;

a first control switch, electrically connected to the first electromagnet and disposed on the secondary door; and a second control switch, electrically connected to the second electromagnet and disposed on the main door;

wherein the first control switch is configured to receive an on command from a user when the user operates the first control switch before wanting to open the secondary door, to correspondingly perform on control on a circuit in which the first electromagnet is located; and the first electromagnet is configured to controllably switch on a power supply of the first electromagnet under the action of the first control switch to generate the magnetic attraction force for attracting the first magnet, so that the main door remains in a closed state while the user opens the secondary door; and the second control switch is configured to receive an on command from the user when the user operates the second control switch before wanting to open the main door, to correspondingly perform on control on a circuit in which the second electromagnet is located; and the second electromagnet is configured to controllably switch on a power supply of the second electromagnet under the action of the second control switch to generate the magnetic attraction force for attracting the second magnet, so that the secondary door remains a closed state while the user opens the main door.

2. The refrigerator according to claim 1, wherein the first control switch is further configured to automatically enable the circuit where the first electromagnet is located to be an open circuit after a preset time from the user operating the first control switch; and the second control switch is further configured to automatically enable the circuit where the second electromagnet is located to be an open circuit after a preset time from the user operating the second control switch.

3. The refrigerator according to claim 1, wherein a first storage space is defined inside the refrigerator body, the first storage space has a first opening forward, and the main door is pivotally connected to one side of the refrigerator body to open and close the first opening; and a second storage space is defined inside the main door, the second storage space has a second opening forward, and the secondary door is pivotally connected to one side of the main door to open and close the second opening.

4. A refrigerator, comprising:

a refrigerator body;

a main door disposed at an outer side of the refrigerator body, and a secondary door disposed at an outer side of the main door;

a first magnet, disposed in an area of the refrigerator body opposite the main door;

a second magnet, disposed in an area of the secondary door opposite the main door; and an electromagnetic assembly, disposed on the main door and comprising:

a third electromagnet, disposed along a front-rear direction of the main door, and configured to change the magnetism of both ends of the third electromagnet by changing the direction of its current;

wherein the sides, facing the third electromagnet, of the first magnet and the second magnet have the same magnetism, so that a magnetic attraction force is always generated between the third electromagnet and the first magnet or between the third electromagnet and the second magnet in a current direction changing process of the third electromagnet;

wherein the third electromagnet is configured to:

generate the magnetic attraction force for attracting the second magnet and a magnetic repulsion force for repelling the first magnet, so as to enable the secondary door to be in a closed state and assist in opening the main door under the action of the magnetic attraction force when a user opens the main door; or generate the magnetic attraction force for attracting the first magnet and a magnetic repulsion force for repelling the second magnet, so as to enable the main door to be in a closed state and assist in opening the secondary door under the action of the magnetic attraction force when the user opens the secondary door.

5. The refrigerator according to claim 4, wherein the electromagnetic assembly further comprises:

a first touch control unit, disposed on the main door, and configured to receive a command that a user opens the main door;

a second touch control unit, disposed on the secondary door, and configured to receive a command that a user opens the secondary door; and a control unit, electrically connected to the first touch control unit and the second touch control unit, respectively, and configured to:

receive a command signal sent by the first touch control unit, and control the current of the third electromagnet to flow in a first direction, to make the third electromagnet generate the magnetic attraction force for attracting the second magnet, so as to enable the secondary door to be in a closed state under the action of the magnetic attraction force when the user opens the main door; or receive a command signal sent by the second touch control unit, and control the current of the third electromagnet to flow in a direction opposite to the first direction, to make the third electromagnet generate the magnetic attraction force for attracting the first magnet, so as to enable the main door to be in a closed state under the action of the magnetic attraction force when the user opens the secondary door.

6. The refrigerator according to claim 5, wherein the main door is provided with a first handle, and the secondary door is provided with a second handle; and the first touch control unit is disposed on the first handle, and the second touch control unit is disposed on the second handle.

7. The refrigerator according to claim 6, wherein a distance between the first handle and the second handle is not less than 3 cm.

8. The refrigerator according to claim 4, wherein an area of the main door opposite the refrigerator body and an area of the main door opposite the secondary door are separately provided with a magnetic door seal, and the magnetic door seals are configured such that the magnetic door seals are used to attract the refrigerator body and the secondary door in a state where the third electromagnet is not energized, to seal gaps between the main door and the secondary door, and between the main door and the refrigerator body.

9. The refrigerator according to claim 4, wherein a first storage space is defined inside the refrigerator body, the first storage space has a first opening forward, and the main door is pivotally connected to one side of the refrigerator body to open and close the first opening; and a second storage space is defined inside the main door, the second storage space has a second opening forward, and the secondary door is pivotally connected to one side of the main door to open and close the second opening.

10. The refrigerator according to claim 4, wherein the control unit is further configured to cut off the third electromagnet after a preset time from applying current to the third electromagnet.

* * * * *